United States Patent
Kunz

(10) Patent No.: US 10,858,477 B2
(45) Date of Patent: Dec. 8, 2020

(54) ACCELERATED CURING OF UNSATURATED POLYMER RESINS

(71) Applicant: United Initiators GmbH, Pullach (DE)

(72) Inventor: Martin Kunz, Pullach (DE)

(73) Assignee: United Initiators GmbH, Pullach (DE)

(*) Notice: Subject to any disclaimer, the term of this patent is extended or adjusted under 35 U.S.C. 154(b) by 116 days.

(21) Appl. No.: 16/314,921

(22) PCT Filed: Jul. 7, 2017

(86) PCT No.: PCT/EP2017/067060
§ 371 (c)(1),
(2) Date: Jan. 3, 2019

(87) PCT Pub. No.: WO2018/007576
PCT Pub. Date: Jan. 11, 2018

(65) Prior Publication Data
US 2019/0202979 A1    Jul. 4, 2019

(30) Foreign Application Priority Data
Jul. 8, 2016    (EP) .................................... 16178671

(51) Int. Cl.
| | | |
|---|---|---|
| *C08G 63/87* | (2006.01) | |
| *C08K 5/37* | (2006.01) | |
| *C08K 5/25* | (2006.01) | |
| *C08L 5/14* | (2006.01) | |
| *C08F 20/10* | (2006.01) | |
| *C08F 20/14* | (2006.01) | |
| *C08G 63/02* | (2006.01) | |
| *C08L 33/12* | (2006.01) | |

(Continued)

(52) U.S. Cl.
CPC .............. *C08G 63/87* (2013.01); *C08F 20/10* (2013.01); *C08F 20/14* (2013.01); *C08F 290/061* (2013.01); *C08G 63/02* (2013.01); *C08K 5/0025* (2013.01); *C08K 5/14* (2013.01); *C08K 5/37* (2013.01); *C08L 33/12* (2013.01)

(58) Field of Classification Search
CPC ......... C08G 63/87; C08G 63/02; C08F 20/10; C08F 20/14; C08F 290/061; C08K 5/0025; C08K 5/14; C08K 5/37; C08L 33/12
USPC ........................................................ 526/214
See application file for complete search history.

(56) References Cited

U.S. PATENT DOCUMENTS 3,959,103 A * 5/1976 Larsen ................. C08G 63/918
522/33
4,839,417 A    6/1989 Suetterlin et al.
(Continued)

FOREIGN PATENT DOCUMENTS

| | | |
|---|---|---|
| GB | 810570 | 3/1959 |
| WO | 98/11159 A1 | 3/1998 |

(Continued)

OTHER PUBLICATIONS

PCT International Search Report and Written Opinion for PCT Application No. PCT/EP2017/067060 dated Sep. 20, 2017 (13 pages).

*Primary Examiner* — William K Cheung
(74) *Attorney, Agent, or Firm* — Eversheds Sutherland (US) LLP

(57) ABSTRACT

The invention relates to the cold curing and warm curing of unsaturated polyester resins, such as polyester resins and methyl methacrylate resins using mercaptans as reaction accelerators.

14 Claims, 15 Drawing Sheets

(51) Int. Cl.
    *C08K 5/00* (2006.01)
    *C08K 5/14* (2006.01)
    *C08F 290/06* (2006.01)

(56) References Cited

U.S. PATENT DOCUMENTS

| | | |
|---|---|---|
| 5,310,826 A | 5/1994 | Giovando |
| 5,972,272 A | 10/1999 | Nagase et al. |
| 2014/0309378 A1 | 10/2014 | Jansen et al. |

FOREIGN PATENT DOCUMENTS

| | | |
|---|---|---|
| WO | 2008/097065 A1 | 8/2008 |
| WO | 2015/195336 A1 | 12/2015 |

\* cited by examiner

ACCELERATED CURING OF UNSATURATED POLYMER RESINS

CROSS REFERENCE TO RELATED APPLICATIONS

This application claims the priority benefit of PCT/EP2017/067060 filed on Jul. 7, 2017 which claims priority benefit of European Application No. 16178671.0 filed Jul. 8, 2016. The entire contents of which are hereby incorporated by reference herein.

The invention relates to the cold curing and warm curing of unsaturated polymer resins, such as polyester resins and methyl methacrylate resins, using mercaptans as reaction accelerators.

Unsaturated polymer resins (reaction resins) contain, in the main chain, olefinic double bonds that allow copolymerization reactions. For processing, they are dissolved in a copolymerizable monomer, such as styrene, α-methyl styrene or methyl methacrylate. After adding an initiator and an accelerator, three-dimensionally cross-linked thermosetting polymers cured by radical polymerization are produced.

Organic peroxides together with accelerators are generally used as initiators. Typical examples are diacyl peroxides, such as dibenzoyl peroxide, in combination with a tertiary amine, such as dimethylaniline or diethoxy-p-toluidine, as the accelerator. Other frequently used systems that are implemented within room temperature range (cold curing) are ketone peroxides together with a cobalt-containing accelerator (such as methyl ethyl ketone peroxide and cobalt octoate) and cobalt-amine combinations.

Warm curing and hot curing of unsaturated polymer resins (UP resins) are carried out in the temperature range of approx. 40° C. to 150° C. Often, no accelerator is added. In order to nevertheless achieve sufficiently rapid curing, accelerators and optionally a promotor can also be added (P. H. Selden, *Glasfaserverstärkte Kunststoffe* [Fibreglass reinforced plastics materials], Springer-Verlag 1967, page 118). Promoters are compounds which are not accelerators when used alone, but which additionally activate systems made up of peroxides and accelerators. Of the accelerators, heavy-metal-containing compounds, such as cobalt salts, have come under criticism recently due to their toxicity.

Mercaptans have already occasionally been used as accelerators, but only to limited effect (Selden, page 129). In addition, until now mercaptans have generally been used in combination with metal salts. Metals, particularly heavy metals and the salts thereof, are however undesirable due to their toxicity.

In the present invention, it has now surprisingly been found that mercaptans are also suitable on their own, in the absence of heavy-metal salts, as accelerators for the curing of unsaturated polymer resins. In a first aspect, the invention therefore relates to a method for curing an unsaturated polymer resin, comprising radical polymerization of the unsaturated polymer resin with one or more copolymerizable monomers in the absence of heavy metals and heavy-metal salts, an initiator system being used that comprises one or more organic peroxides and one or more mercaptans.

Unsaturated polymer resins within the meaning of the invention are, in particular, unsaturated polyester resins, methyl methacrylate resins and vinyl ester resins. In particular, the curing of orthophthalic-acid-based unsaturated polyester resins can be particularly effectively accelerated by mercaptans.

According to the invention, the curing of unsaturated polymer resins is carried out in the absence of heavy metals and heavy-metal salts. Particularly preferably, the radical polymerization is carried out in the absence of any metals and metal salts. Within the meaning of the invention, the term "heavy metal" denotes a metal of which the density is greater than 5.0 g/cm². These in particular include the noble metals and bismuth, iron, copper, lead, zinc, tin, cobalt, nickel, cadmium and chromium. The phrase "in the absence of" should be understood within the meaning of the invention such that no heavy metals or heavy-metal salts, and preferably no metals or metal salts whatsoever, are added to the reaction system. Unavoidable trace quantities which, for example, get into the reaction system from preliminary stages often cannot be avoided, however. Therefore, the total quantity of heavy metals or heavy-metal salts or of metals and metal salts in the reaction system is preferably less than 50 ppm, preferably less than 10 ppm or less than 5 ppm. Quantities of less than 1 ppm or the complete absence of heavy metals or heavy-metal salts, i.e. 0 ppm (based on the total quantity of solids in the reaction system in each case), are particularly preferred. A total quantity of metals and metal salts of less than 1 ppm or 0 ppm is particularly preferred.

The curing of unsaturated polymer resins according to the invention preferably takes place in the absence of tertiary amines, particularly preferably in the absence of any amines. It has been found that mercaptans are also capable of accelerating the radical polymerization with organic peroxides as initiators on their own, without additionally using amines. The quantity of amines in the reaction system is preferably less than 50 ppm, preferably less than 10 ppm or less than 5 ppm. Quantities of less than 1 ppm or the complete absence of amines, i.e. 0 ppm (based on the total quantity of solids in the reaction system in each case), are particularly preferred.

According to the invention, mercaptans are suitable both for cold curing and warm curing of unsaturated polymer resins by radical polymerization. It has been found that, by using mercaptans as accelerators, the application temperatures of peroxides can be reduced, both in cold curing and in warm curing. According to the invention, warm curing is preferably carried out at a temperature in the range of approx. 40-150° C. Cold curing is preferably carried out at a temperature of less than 40° C., in particular in the range of approx. 18-35° C., preferably approx. 20-30° C.

Low temperatures are particularly advantageous in applications such as sewer renovations, manual lamination and fully automated processes, such as the manufacture of plane plates, and they save energy and help to prevent losses of volatile monomer components such as styrene. In addition, in warm curing and hot curing, low temperatures also reduce the cycle times in hot-pressing processes for SMC/BMC components and in the hot curing of artificial marble slabs (Breton technology) and pultrusion.

The claimed curing of an unsaturated polymer resin involves radical polymerization using an initiator system which comprises one or more organic peroxides. In principle, according to the invention any peroxide can be accelerated by being combined with one or more mercaptans. Examples of organic peroxides and peroxide combinations are cumyl hydroperoxide (CUHP), dicumyl peroxide (DCUP), tert-butylperoxy-2-ethylhexanoate (TBPEH), tert-butyl peroxy-3,5,5-trimethylhexanoate (TBPIN), also in solution with acetylacetone, tert-butyl peroxybenzoate (TBPB), also in solution with acetylacetone, dilauroyl peroxide (LP), bis-(4-tert-butylcyclohexyl)-peroxydicarbonate (BCHPC), dimyristyl peroxydicarbonate (MYPC), tert-butylperoxy-2-ethylhexylcarbonate (TBPEHC) and 2,5-dimethyl-2,5-di-(tert-butylperoxy)-hexane (DHBP), methyl isobutyl ketone peroxide (MIKP) and tert-amylperoxy-2-ethylhexanoate (TAPEH).

Combinations of peroxides, in particular combinations of two or more of the above-mentioned organic peroxides, can also be accelerated, such as BCHPC and MYPC.

An advantage of using mercaptans within the meaning of the invention is the considerably lower toxicity thereof compared with the cobalt compounds, in particular cobalt octoate, which have been frequently used until now. The mercaptans are preferably water-clear, non-discolouring mercaptans. This results in a considerable reduction in additives of covering pigments such as titanium dioxide, which is particularly advantageous in white gel coats and white artificial stone. Mercaptans can be mixed with the other components of the radical polymerization system in virtually any way. In particular, the miscibility with various monomers such as methyl methacrylate, unsaturated polymer resins and vinyl ester resins or solvents such as esters, alcohols and aromatics is very good.

In the present invention, in particular the mercaptans glycol dimercaptoacetate (GDMA), pentaerythritol tetrakis (3-mercaptopropionate) (PETMP), pentaerythritol tetrakis (2-mercaptoacetate) (PMTMA) and isooctyl thioglycolate (IOTG) have proven to be particularly suitable. Likewise, combinations of two or more of these mercaptans are suitable.

In a particularly preferred embodiment of the invention, an initiator system is used which comprises the mercaptan IOTG and the organic peroxide BCHPC or PETMP and MIKP.

In principle, any copolymerizable monomers can be used for the claimed curing of an unsaturated polymer resin. Styrene and allyl esters are particularly suitable as copolymerizable monomers. Likewise (meth)acrylic acid esters, such as methyl methacrylate, or substituted styrenes, such as in particular tert-butyl styrene, are suitable. Mixtures of two or more of the above-mentioned copolymerizable monomers or mixtures with other comonomers are also possible.

In another aspect, the invention relates to the use of one or more mercaptans as accelerators for the curing of unsaturated polymer resins in a reaction system free of heavy-metal salts. The aspects described above in connection with the method according to the invention for curing an unsaturated polymer resin apply similarly to the use according to the invention.

The invention also relates to a composition comprising an unsaturated polymer resin, one or more mercaptans and one or more organic peroxides. Heavy metals and heavy-metal salts are not contained in the composition. Preferably, no metals or metal salts whatsoever are contained, as specified above. More preferably, the composition does not contain any tertiary amines either, and particularly preferably does not contain any amines whatsoever, as specified above. In a particularly preferred aspect, the composition according to the invention consists of one or more unsaturated polymer resins, one or more mercaptans and one or more organic peroxides. In another aspect, the composition according to the invention consists of one or more mercaptans, one or more organic peroxides and one or more copolymerizable monomers.

In another aspect, the invention relates to a kit comprising:
(i) at least one unsaturated polymer resin and
(ii) a heavy-metal-free and heavy-metal-salt-free initiator system comprising one or more organic peroxides and one or more mercaptans.

Furthermore, one or more copolymerizable monomers may be part of the kit according to the invention. The kit, according to the invention, is free of heavy metals and heavy-metal salts, and is preferably free of any metals and metal salts, as specified above. More preferably, the kit, according to the invention, does not contain any tertiary amines either, and particularly preferably does not contain any amines whatsoever, as specified above. Reference is made to the preceding part of the description for the definition of unsaturated polymer resins, copolymerizable monomers, organic peroxides and mercaptans.

In the invention, it has also been found that mercaptans on their own do not demonstrate any tendency towards polymerization in an unsaturated polymer resin. The invention therefore also provides a pre-accelerated resin, which is a composition that comprises an unsaturated polymer resin and one or more mercaptans, as specified above, but does not comprise any peroxides. According to the invention, the composition preferably does not comprise any additional solvents. The composition does not contain any heavy metals and heavy-metal salts. Preferably, said composition does not contain any metals or metal salts whatsoever, as specified above. More preferably, the composition does not contain any tertiary amines either, and particularly preferably does not contain any amines whatsoever, as specified above. In a particularly preferred aspect, the composition according to the invention consists of one or more unsaturated polymer resins and one or more mercaptans. In another aspect, the composition according to the invention consists of one or more unsaturated polymer resins, one or more mercaptans and one or more copolymerizable monomers.

The invention shall be explained further on the basis of the following examples and figures.

EXAMPLES

Description of the Experiment:

The following measurements were taken in accordance with the DIN 19645 standard:

Block curing 20 g of an unsaturated polymer resin in double-walled test tubes (air gap) in the water/oil bath, recording the exothermic reaction by means of PT-100 thermoelments using time recording.

The alternative accelerators GDMA, PETMP and IOTG were used as 10% solutions in ethyl acetate in order to allow a more precise dosage. In addition, Thiocure PETMP was used as a 50% solution in Rhodiasolv.

A medium-reactive standard resin Palatal P4 or P6 from DSM was selected as the orthophthalic acid resin. Degadur 1008 from Evonik was used as the methyl methacrylate and Derakane 411-350 from Ashland was used as the vinyl ester resin.

The accelerators mentioned below in the series of experiments are dosed as a solution in the following composition:

| | |
|---|---|
| Co-1 | 1% cobalt octoate solution in aliphatic ester |
| DMA | 10% solution of dimethylaniline in styrene |
| CA-12 | 10% solution of dimethylaniline + 2% cobalt octoate in aliphatic ester |

The following are stated as mercapto accelerators:

| | |
|---|---|
| PETMP | 10% solution of pentaerythritol tetra-3-mercaptopropionate in ethyl acetate (unless otherwise stated) |
| GDMA | 10% solution of glycol dimercaptoacetate in ethyl acetate |
| IOTG | 10% solution of isooctyl thioglycolate in ethyl acetate |

Other solvents are also possible in addition to ethyl acetate (esters, alcohols, etc.).

The stated percentages relate to weight ratios (w/w). In the dosage quantity for the peroxides, the stated quantity relates to the quantity of peroxide that is added to the 100% resin. For the accelerators, the stated dosage likewise relates to the quantity of accelerator solution that is added to the 100% resin.

1. Cold Curing or Curing at Slightly Increased Temperatures (40° C.) of Orthophthalic Acid Resins 1.1 Curing at 40° C. Bath Temperature, Palatal P4, DIN 19645, Acceleration of 1% BCHPC

| Peroxide (1%) | Mercapto accelerator solution | Gel time in min | Curing time in min | Exothermic peak in ° C. | Bath temperature in ° C. |
|---|---|---|---|---|---|
| BCHPC | none | 94 | 120 | 136 | 40 |
| BCHPC | 1% PETMP | 30 | 39 | 131 | 40 |
| BCHPC | 1% IOTG | 12 | 21 | 139 | 40 |
| BCHPC | 1% GDMA | 24 | 34 | 138 | 40 |

Figure 1:
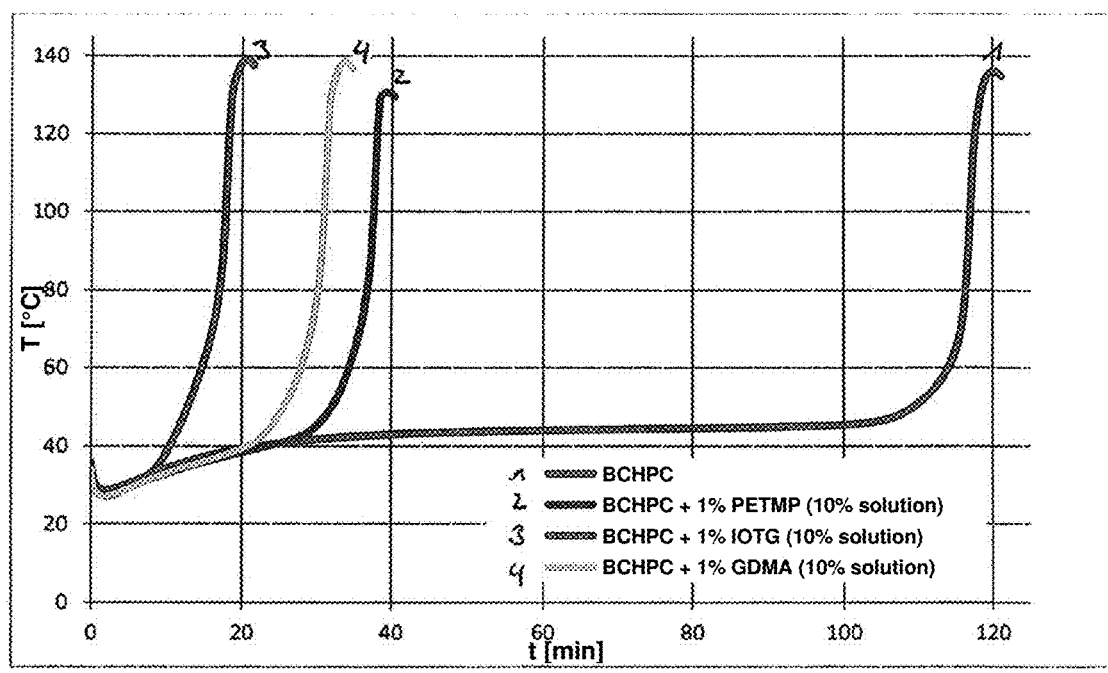
FIG. 1 shows the curing curve for the reaction of an orthophthalic-acid-based unsaturated polyester resins (Palatal P4) with 1% BCHPC at a slightly increased temperature of 40° C. in the presence of various mercaptans.

The results are shown in FIG. 1.

1.2 Curing at 25° C. Bath Temperature, Palatal P4, DIN 19645, Acceleration of 2% BCHPC

| Peroxide | Mercapto accelerator solution | Gel time in min | Curing time in min | Exothermic peak in ° C. | Bath temperature in ° C. |
|---|---|---|---|---|---|
| BCHPC (2%) | 1% PETMP | 38 | 57 | 111 | 25 |
| BCHPC (2%) | 1% IOTG | 12 | 26 | 123 | 25 |
| BCHPC (2%) | 1% GDMA | 31 | 48 | 120 | 25 |

Figure 2:
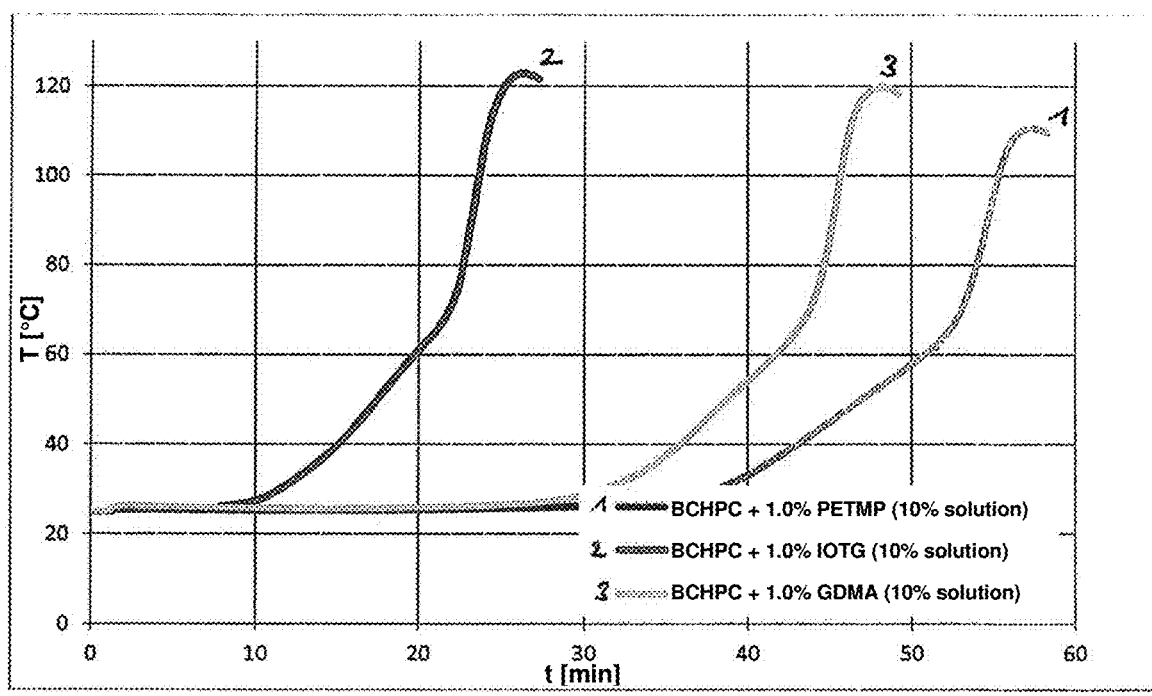
FIG. 2 shows the curing curve for the cold curing of Palatal P4 at a temperature of 25° C. using the organic peroxide BCHPC (2%) in the presence of various mercaptans.

The results are shown in FIG. 2.

1.3 Curing at 40° C. Bath Temperature, Palatal P4, DIN 19645, Acceleration of 1% CUROX I-300 (MIKP)

| Peroxide (1%) | Mercapto accelerator solution | Accelerator | Gel time in min | Curing time in min | Exothermic peak in ° C. | Bath temperature in ° C. |
|---|---|---|---|---|---|---|
| Curox I-300 | | | 67 | 99 | 136 | 40 |
| Curox I-300 | | 0.50% Co-1 | 27 | 29 | 153 | 40 |

-continued

| Peroxide (1%) | Mercapto accelerator solution | Accelerator | Gel time in min | Curing time in min | Exothermic peak in ° C. | Bath temperature in ° C. |
|---|---|---|---|---|---|---|
| Curox I-300 | 1% PETMP | | 22 | 46 | 133 | 40 |
| Curox I-300 | 1% IOTG | | 22 | 58 | 113 | 40 |
| Curox I-300 | 1% GDMA | | 19 | 42 | 132 | 40 |

Figure 3:
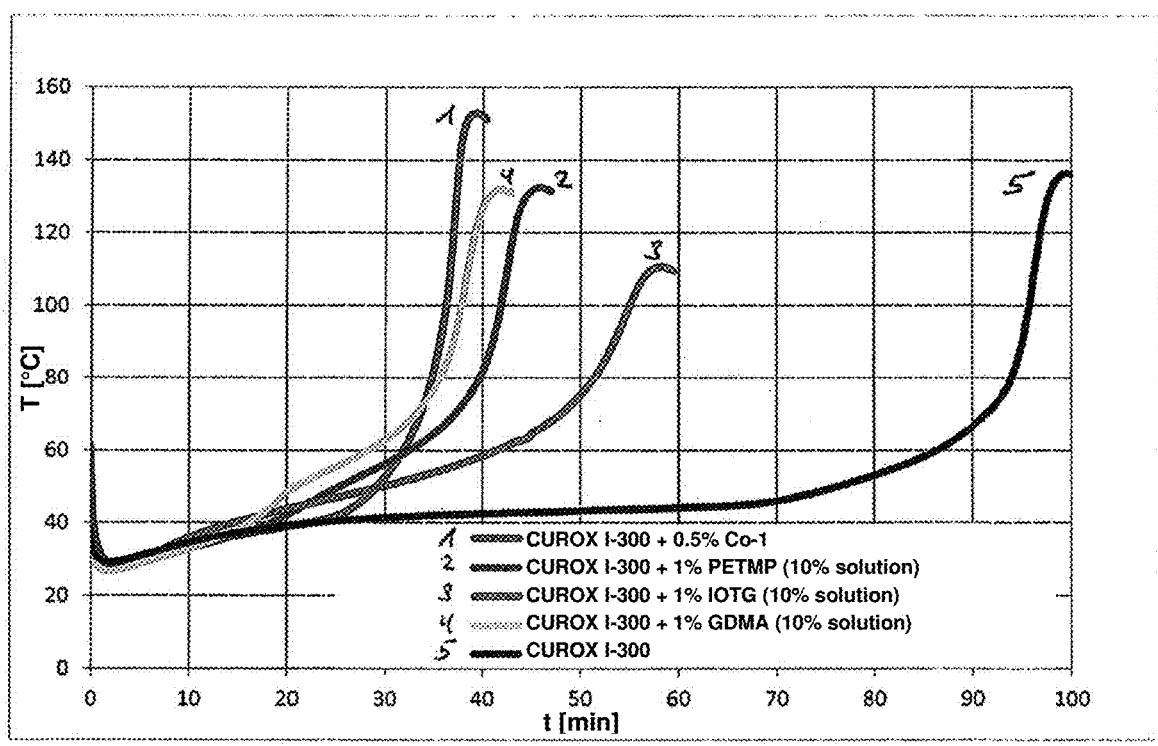
FIG. 3 shows the curing curve for the curing of Palatal P4 at a slightly increased temperature of 40° C. using 1% CUROX®I-300 (MIKP) in the presence of different mercaptans and cobalt octoate as a comparative example.

The example shows that methyl isobutyl ketone peroxide (MIKP) is in principle capable of acceleration, but the efficiency of cobalt octoate is not reached since although the reaction with thioesters begins at an early stage, it proceeds somewhat more slowly. The results are shown in FIG. 3.

1.4 Curing at 25° C. Bath Temperature, Palatal P6, DIN 19645, Acceleration of Thiocure PETMP and TAPEH

| Peroxide | Mercapto accelerator solution | Gel time in min | Curing time in min | Exothermic peak in ° C. | Bath temperature in ° C. |
|---|---|---|---|---|---|
| 0.5% TAPEH | 0.05% PETMP | 107.7 | 133.8 | 68 | 25 |
| 0.8% TAPEH | 0.05% PETMP | 65.5 | 87.7 | 152 | 25 |
| 1.0% TAPEH | 0.05% PETMP | 54.4 | 73 | 161 | 25 |

-continued

| Peroxide | Mercapto accelerator solution | Gel time in min | Curing time in min | Exothermic peak in ° C. | Bath temperature in ° C. |
|---|---|---|---|---|---|
| 1.5% TAPEH | 0.05% PETMP | 38.4 | 53.9 | 172 | 25 |
| 2.0% TAPEH | 0.05% PETMP | 28.8 | 44.5 | 174 | 25 |

PETMP was used as a 50% solution in Rhodiasolv (methyl-5-(dimethylamino)-2-methyl-5-oxopentanoate).

Figure 14:
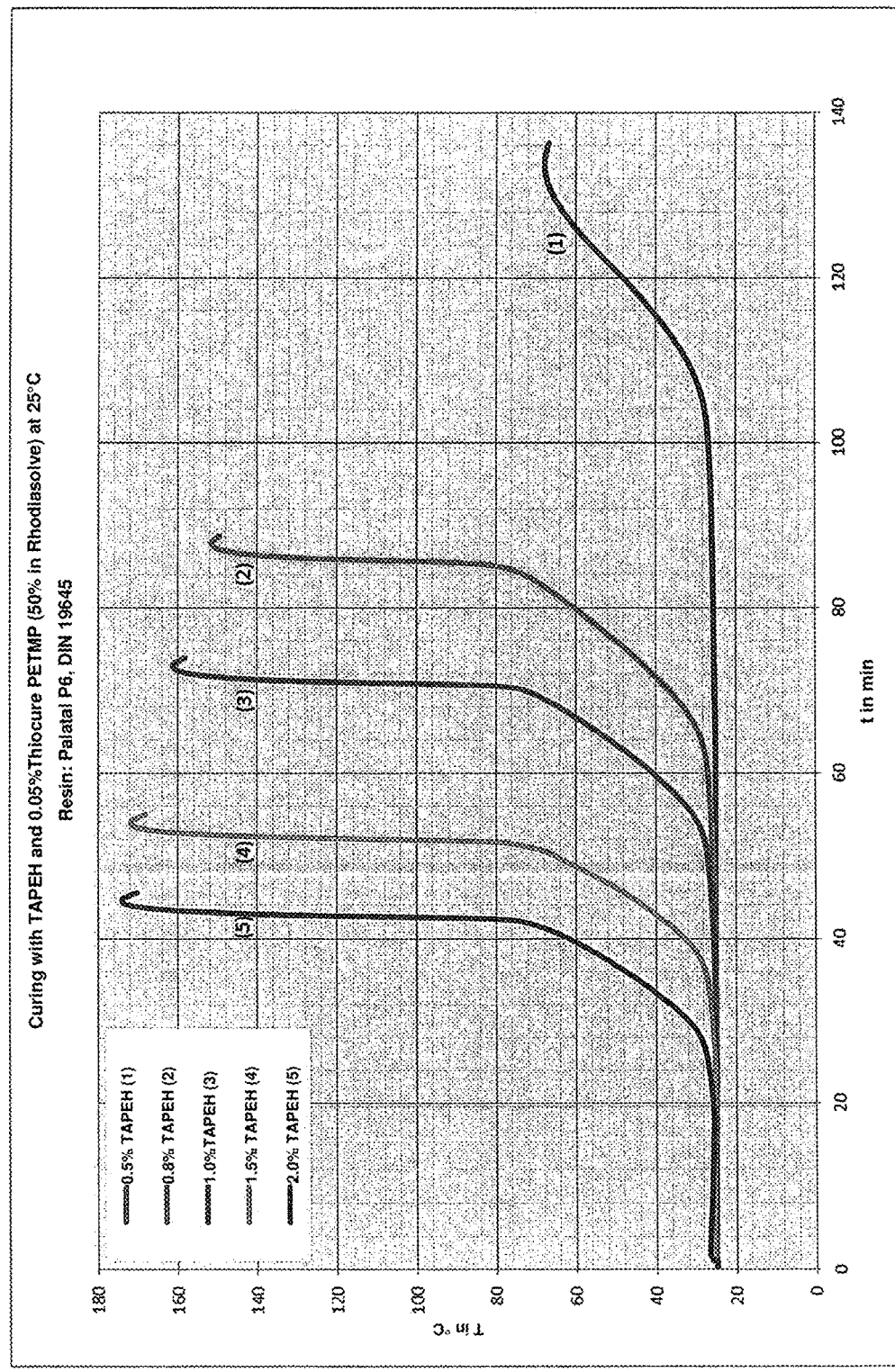
FIG. 14 shows the curing curve for the cold curing of Palatal P6 at a temperature of 25° C. using the organic peroxide TAPEH in different concentrations (0.5%, 0.8%, 1.0%, 1.5% and 2.0%) in the presence of the mercaptan PETMP (0.05% Thiocure PETMP, 50% in Rhodiasolv).

The example shows that the curing speed increases when the peroxide quantity increases and the PETMP quantity remains the same. The results are shown in FIG. 14.

1.5 Curing at 40° C. Bath Temperature, Palatal P4, DIN 19645, Acceleration of 1% BCHPC in Combination with PETMP or Co-1

| Peroxide (1%) | Mercapto accelerator solution | Accelerator | Gel time in min | Curing time in min | Exothermic peak in ° C. | Bath temperature in ° C. |
|---|---|---|---|---|---|---|
| BCHPC | 0.2% PETMP | | 24.3 | 36 | 133 | 40 |
| BCHPC | 0.5% PETMP | | 21.2 | 30.8 | 134 | 40 |
| BCHPC | | 0.2% Co-1 | 68.3 | 115 | 141 | 40 |
| BCHPC | | 0.5% Co-1 | 156 | 172 | 133 | 40 |

PETMP was used as a 10% solution in ethyl acetate.

Figure 15:
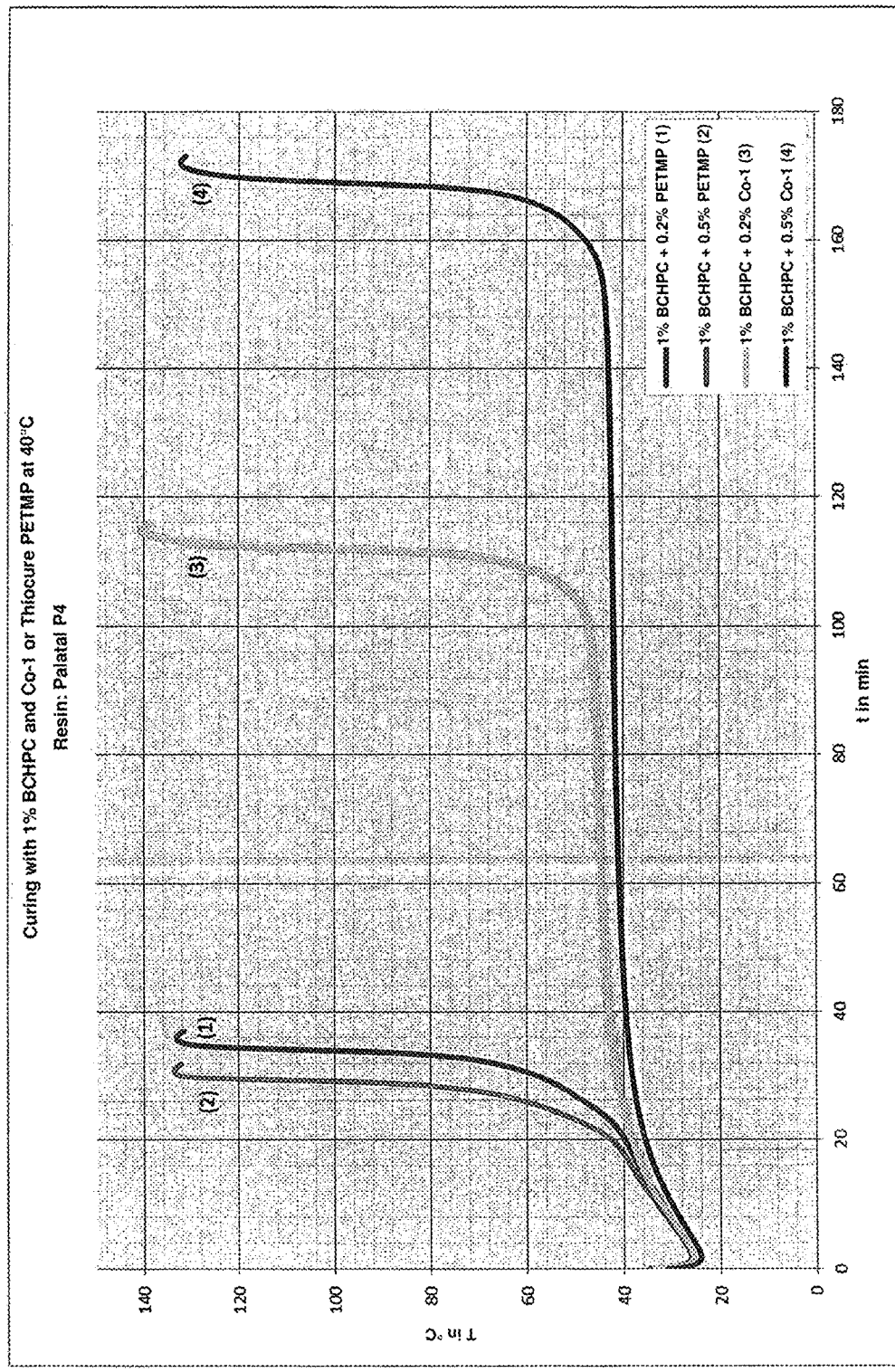
FIG. 15 shows the curing curve for the curing of Palatal P4 at a slightly increased temperature of 40° C. using 1% BCHPC in the presence of the mercaptan PETMP in a concentration of 0.2% or 0.5%. The combination of 1% BCHPC with 0.2% or 0.5% cobalt octoate Co-1 is shown as a comparative example.

The example shows that, when using BCHPC, the curing speed barely increases at all by adding the cobalt accelerator Co-1, while even small quantities of the mercaptan PETMP cause a significant increase in the curing speed. The results are shown in FIG. 15.

2. Warm Curing and Hot Curing of Orthophthalic Acid Resins

The standard accelerator cobalt octoate or the combination of cobalt octoate with a dimethylaniline solution was replaced by different mercaptans.

2.1 Curing at 100° C. Bath Temperature, Palatal P4, DIN 19645, Acceleration of 1% TBPB-HA-M3

| Peroxide | Mercapto accelerator solution | Accelerator solution | Gel time in min | Curing time in min | Exothermic peak in ° C. | Bath temperature in ° C. |
|---|---|---|---|---|---|---|
| TBPB-HA-M3 | | | 35 | 39 | 220 | 100 |
| TBPB-HA-M3 | 1% PETMP | | 16 | 19 | 213 | 100 |
| TBPB-HA-M3 | | 0.5% Co-1 | 13 | 15 | 207 | 100 |

Figure 4:
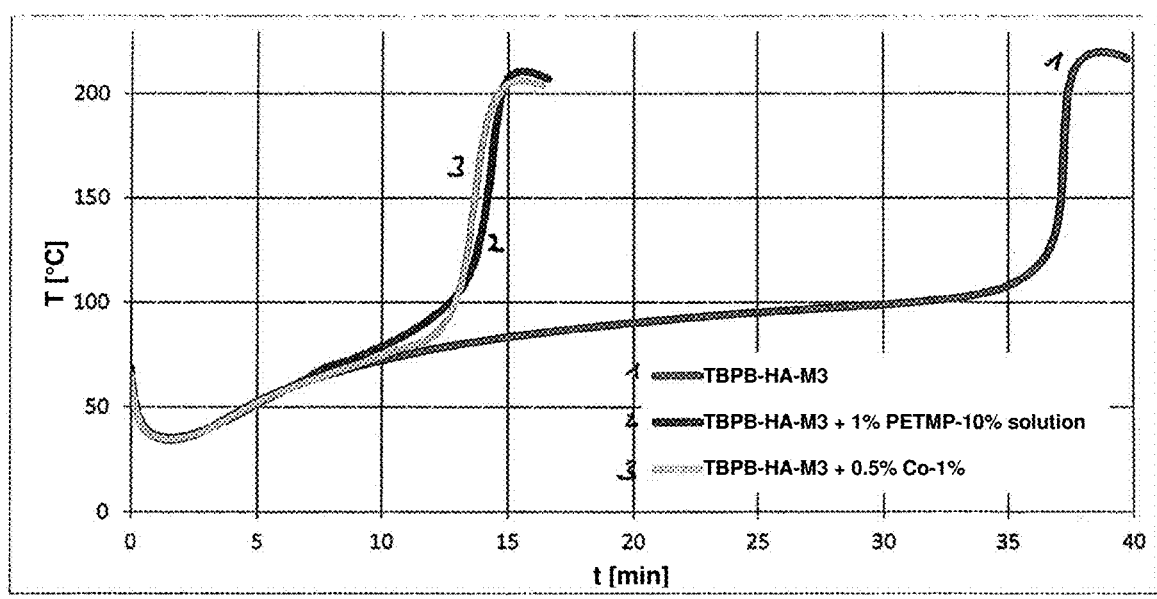
FIG. 4 shows the curing curve for the warm curing of Palatal P4 at 100° C. using 1% TBPB-HA-M3 in combination with the mercaptan PETMP or cobalt octoate as a comparative example.

It has been demonstrated that a cobalt octoate accelerator can be replaced by the mercapto accelerator PETMP with very similar efficiency. The results are shown in FIG. 4.

2.2 Curing at 80° C. Bath Temperature, Palatal P4, DIN 19645, Acceleration of 1.5% CUHP 80%

| Peroxide | Mercapto accelerator solution | Accelerator solution | Gel time in min | Curing time in min | Exothermic peak in ° C. | Bath temperature in ° C. |
|---|---|---|---|---|---|---|
| CUHP 80% | | | 39 | 54 | 175 | 80 |
| CUHP 80% | 1% PETMP | | 19 | 25 | 193 | 80 |
| CUHP 80% | | 0.5% CA-12 | 21 | 25 | 198 | 80 |

Figure 5:
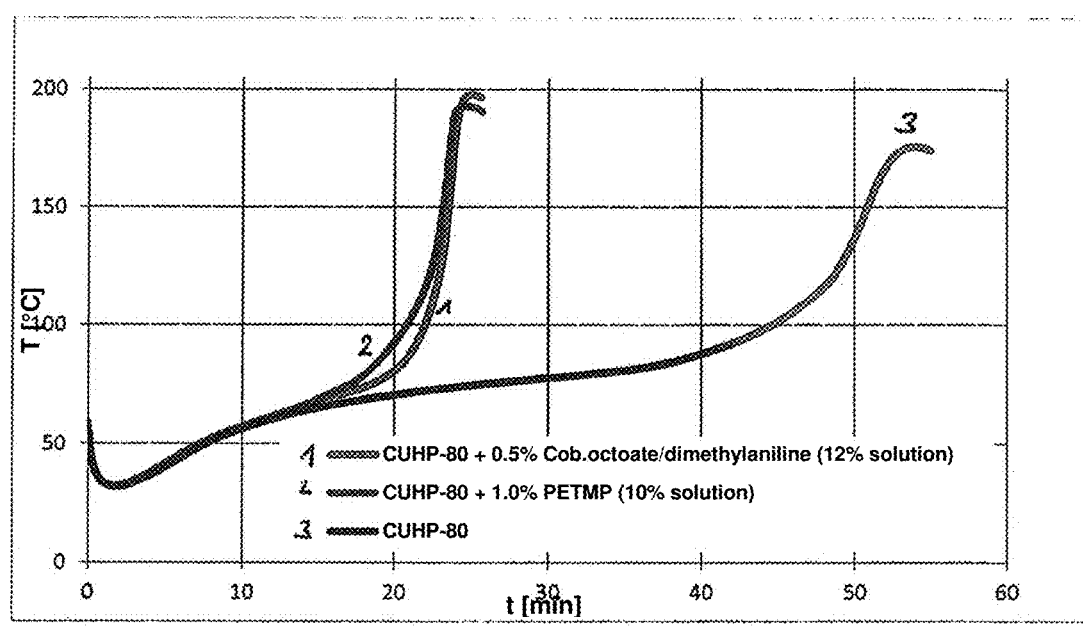
FIG. 5 shows the curing curve for the warm curing of Palatal P4 at 80° C. using 1.5% CUHP (80% solution) in combination with the mercaptan PETMP or with cobalt octoate and dimethylaniline (cobalt/amine) as a comparative example.

It has been demonstrated that a highly efficient cobalt/amine accelerator can be replaced by the mercapto accelerator PETMP with equivalent efficiency. The results are shown in FIG. 5.

2.3 Curing at 100° C. Bath Temperature, Palatal P4, DIN 19645, Acceleration of 1% TBPIN

| Peroxide | Mercapto accelerator solution | Accelerator solution | Gel time in min | Curing time in min | Exothermic peak in ° C. |
|---|---|---|---|---|---|
| TBPIN | | | 27 | 31 | 217 |
| TBPIN | 1% PETMP | | 12 | 14 | 207 |
| TBPIN | | 0.5% Co-1 | 17 | 20 | 209 |

Figure 6:
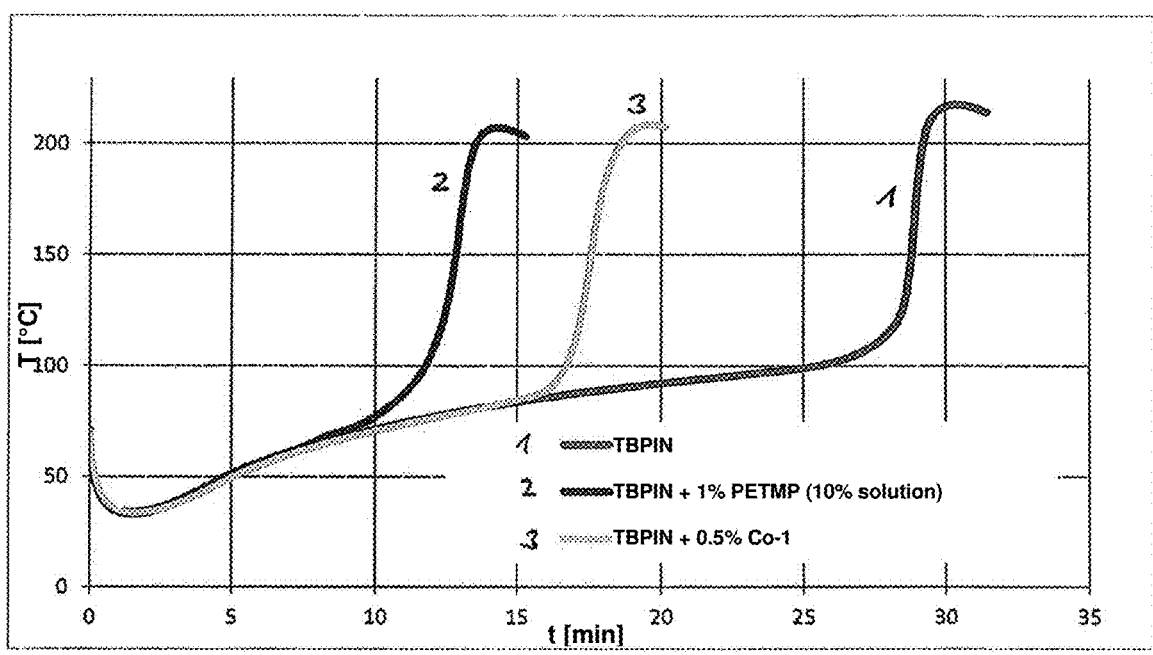
FIG. 6 shows the curing curve for the warm curing of Palatal P4 at 100° C. using 1% TBPIN in combination with the mercaptan PETMP or 0.5% cobalt octoate as a comparative example.

It has been demonstrated that greater acceleration effects can in fact be achieved in the group of peroxyesters compared with the widely used cobalt octoate. The results are shown in FIG. 6.

2.4 Curing at 100° C. Bath Temperature, Palatal P4, DIN 19645, Acceleration of 1% TBPEH

| Peroxide (1.0%) | Mercapto accelerator solution | Accelerator or inhibitor solution | Gel time in min | Curing time in min | Exothermic peak in ° C. |
|---|---|---|---|---|---|
| TBPEH | | | 14.6 | 17.1 | 210 |
| TBPEH | 1% PETMP | | 9.5 | 11.4 | 20.4 |

-continued

| Peroxide (1.0%) | Mercapto accelerator solution | Accelerator or inhibitor solution | Gel time in min | Curing time in min | Exothermic peak in ° C. |
|---|---|---|---|---|---|
| TBPEH | | 0.5% Co-1 | 12.0 | 14.5 | 205 |
| TBPEH | 1% PETMP | 0.5% Ca hydroxide | 12.4 | 14.2 | 210 |

Figure 7:
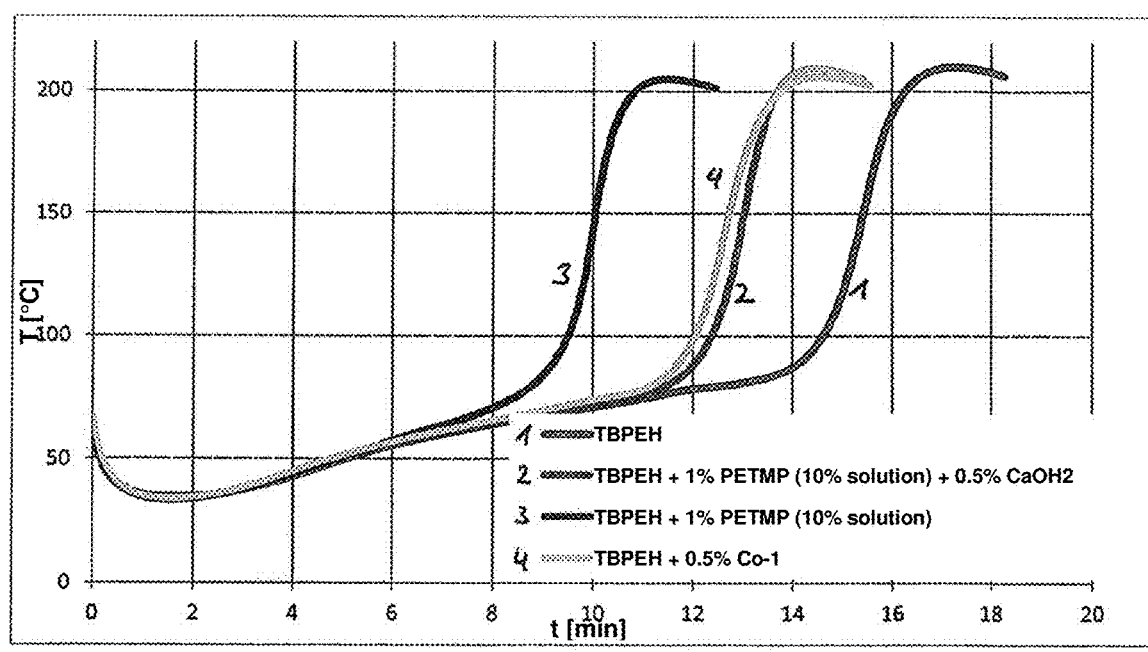
FIG. 7 is a graph of the curing curve for the warm curing of Palatal P4 at 100° C. using 1% TBPEH in combination with the mercaptan PETMP, with and without the addition of calcium hydroxide and cobalt octoate as a comparative example.

It is clear that, in addition to replacing cobalt octoate as the accelerator, it is possible to delay the reaction by shifting the pH by means of calcium hydroxide. The results are shown in FIG. 7.

2.5 Curing at 100° C. Bath Temperature, Palatal P4, DIN 19645, Acceleration of 1% TBPEHC

| Peroxide (1%) | Mercapto accelerator solution | Accelerator or inhibitor solution | Gel time in min | Curing time in min | Exothermic peak in ° C. |
|---|---|---|---|---|---|
| TBPEHC | | | 26 | 29 | 219 |
| TBPEHC | 1% PETMP | | 16 | 19 | 210 |
| TBPEHC | | 0.5% Co-1 | 27 | 31 | 215 |
| TBPEHC | 1% PETMP | 0.5% calcium hydroxide | 20 | 23 | 216 |

Figure 8:
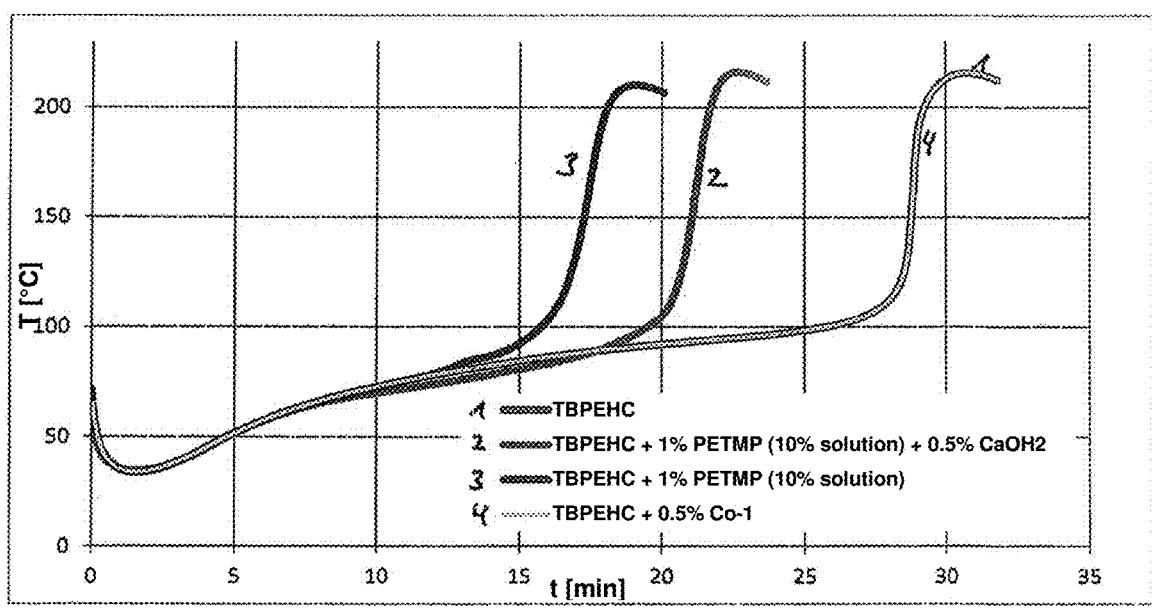
FIG. 8 shows the curve of the curing of Palatal P4 at 100° C. using TBPEHC in combination with the mercaptan PETMP, with and without the addition of calcium hydroxide and cobalt octoate as a comparative example.

It is clear that TBPEHC cannot be accelerated by cobalt octoate, but that PETMP significantly reduces the reaction time, which is in turn slowed by calcium hydroxide. The results are shown in FIG. 8.

2.6 Curing at 60° C. Bath Temperature, Palatal P4, DIN 19645, Acceleration of 1% Dilauroyl Peroxide LP

| Peroxide (1%) | Mercapto accelerator solution | Accelerator solution | Gel time in min | Curing time in min | Exothermic peak in ° C. | Bath temperature in ° C. |
|---|---|---|---|---|---|---|
| LP | | | 110 | 124 | 152 | 60 |
| LP | 1% PETMP | | 92 | 110 | 148 | 60 |
| LP | 1% PETMP | 0.5% DMA | 46 | 57 | 157 | 60 |
| LP | | 0.5% Co-1 | 104 | 117 | 157 | 60 |
| LP | | 0.5% DMA | 59 | 69 | 160 | 60 |

Figure 9:
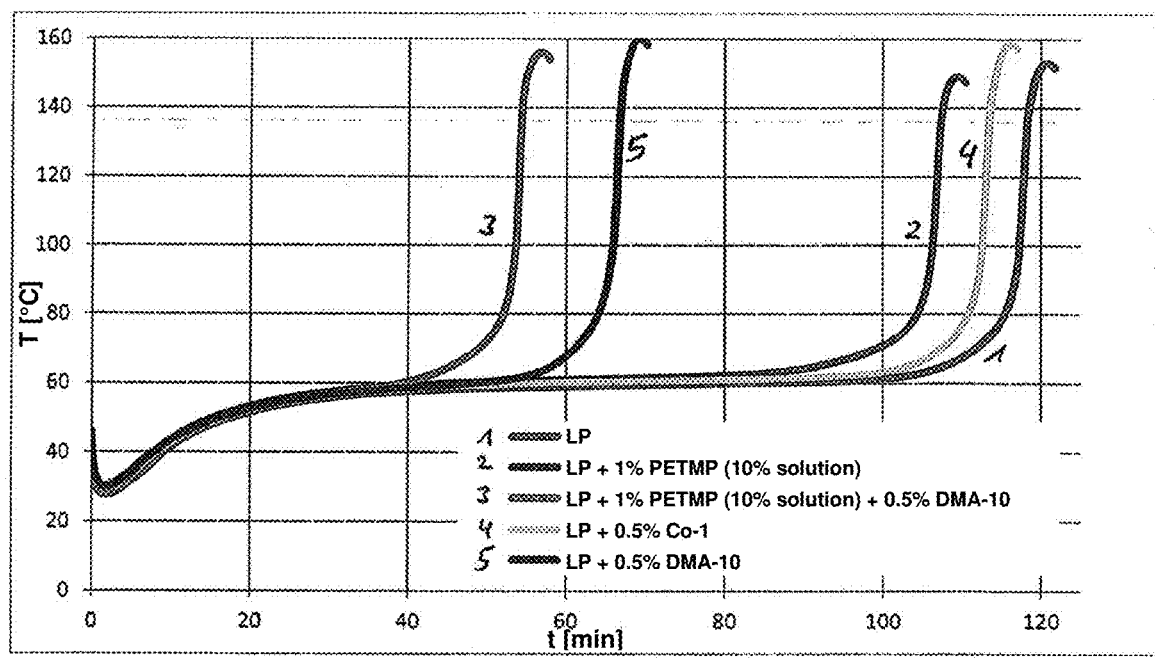
FIG. 9 shows the curve of the warm curing of Palatal P4 at 60° C. using dilauroyl peroxide in combination with the mercaptan PETMP, with and without the addition of dimethylaniline, and with cobalt octoate as a comparative example.

It is clear that cobalt octoate has barely any accelerating effect on LP, and by contrast significantly accelerates a dimethylaniline but could certainly be replaced by PETMP. The results are shown in FIG. 9.

2.7 Curing at 110° C. Bath Temperature, Palatal P4, DIN 19645, Acceleration of 1% Dialkyl Peroxide DHBP

| Peroxide (1%) | Mercapto accelerator solution | Gel time in min | Curing time in min | Exothermic peak in ° C. | Bath temperature in ° C. |
|---|---|---|---|---|---|
| DHBP |  | 37 | 41 | 231 | 110 |
| DHBP | 1.0% PETMP | 35 | 39 | 230 | 110 |
| DHBP | 1.0% IOTG | 24 | 28 | 224 | 110 |
| DHBP | 1.0% GDMA | 29 | 34 | 229 | 110 |
| TBPB |  | 21 | 24 | 225 | 110 |

Figure 10:
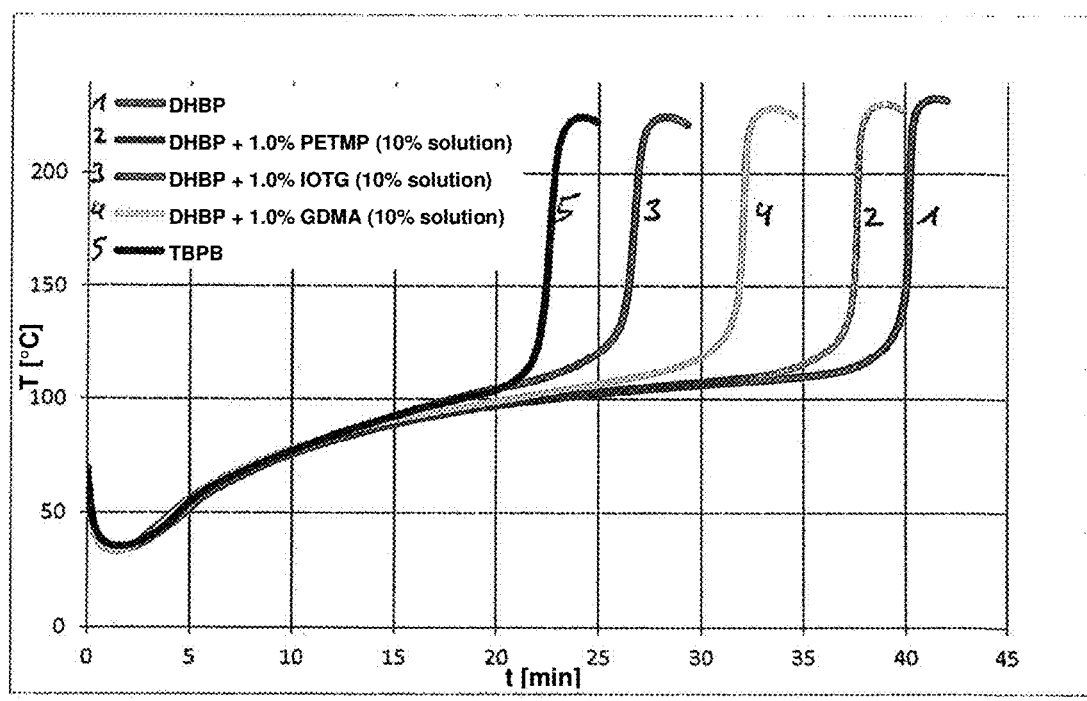
FIG. 10 shows the warm curing of Palatal P4 at 100° C. using 2,5-dimethyl-2,5-di(tert-butylperoxy)hexane (DHBP) in combination with different mercaptans (PETMP, IOTG or GDMA, 1.0% in each case). Curing in the presence of tert-butyl-peroxybenzoate (TBPB) without the addition of mercaptan is shown as a comparative example.

It is clear that a dialkyl peroxide, which is usually not used in the hot curing of polyester resins due to its high thermal stability, can be activated by mercapto accelerators such that curing times are achieved that are considerably closer to the standard hot-pressing process using the peroxide TBPB, and this approach could potentially replace said method. The results are shown in FIG. 10.

2.8 Reduced Dosage of the PETMP in the Curing of Orthophthalic Acid Resin Palatal P4 with a 1% BCHPC and MYPC Mixture in a 1:1 Ratio at 60° C., DIN19645

| Peroxide (1%) | Mercapto accelerator solution | Gel time in min | Curing time in min | Exothermic peak in ° C. | Bath temperature in ° C. |
|---|---|---|---|---|---|
| BCHPC |  | 27 | 132 | 168 | 60 |
| 1:1 BCHPC + MYPC |  | 31 | 37 | 159 | 60 |
| 1:1 BCHPC + MYPC | 0.1% PETMP | 20 | 26 | 145 | 60 |

Figure 11:
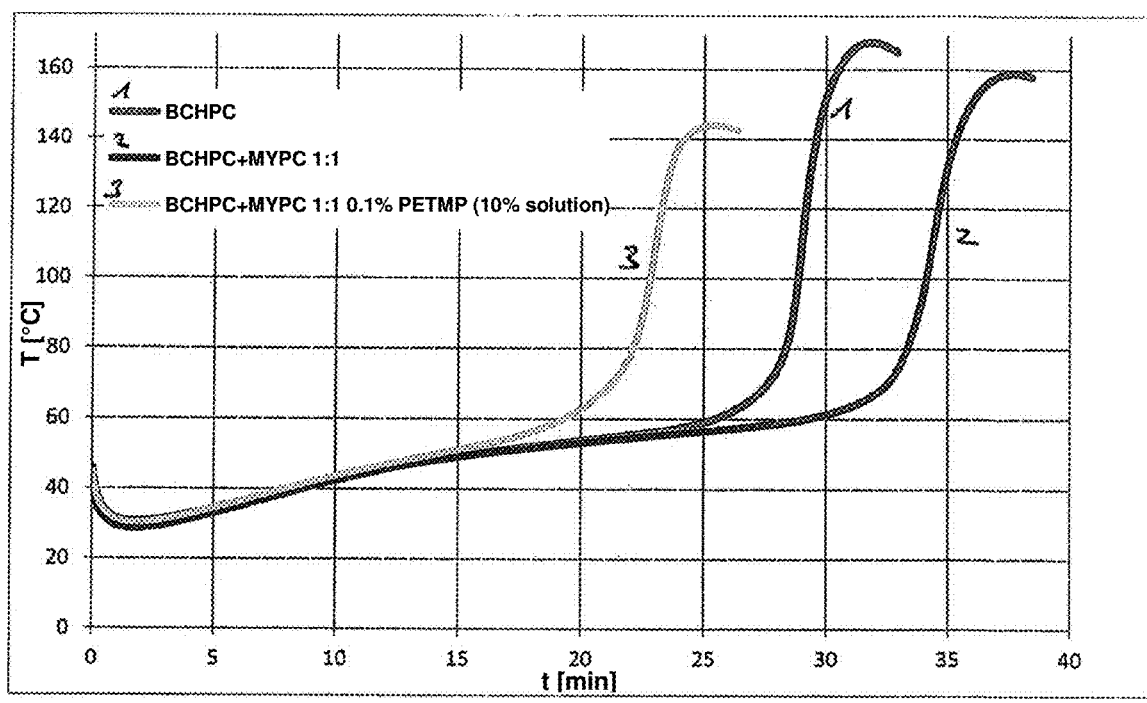
FIG. 11 shows the curing curve for the warm curing of Palatal P4 with BCHPC alone or in combination with MYPC at 60° C. Curing with and without the addition of 0.1% PETMP as an accelerator was investigated.

It is clear that significant accelerations can be achieved even with small quantities of PETMP (100 ppm pure substance), even if peroxide mixtures that exhibit slower behaviour are used. The results are shown in FIG. 11.

3. Curing of Other Resin Systems 3.1 Curing at 60° C. Bath Temperature, Methyl Methacrylate Resin Degadur 1008 (Evonik), DIN 19645, Acceleration of 1% TBPEH

| Peroxide (1%) | Mercapto accelerator solution | Gel time in min | Curing time in min | Exothermic peak in ° C. | Bath temperature in ° C. |
|---|---|---|---|---|---|
| TBPEH |  | 109 | 122 | 134 | 60 |
| TBPEH | 1.0% PETMP | 83 | 100 | 124 | 60 |
| TBPEH | 1.0% IOTG | 96 | 114 | 141 | 60 |
| TBPEH | 1.0% GDMA | 88 | 108 | 142 | 60 |

Figure 12:
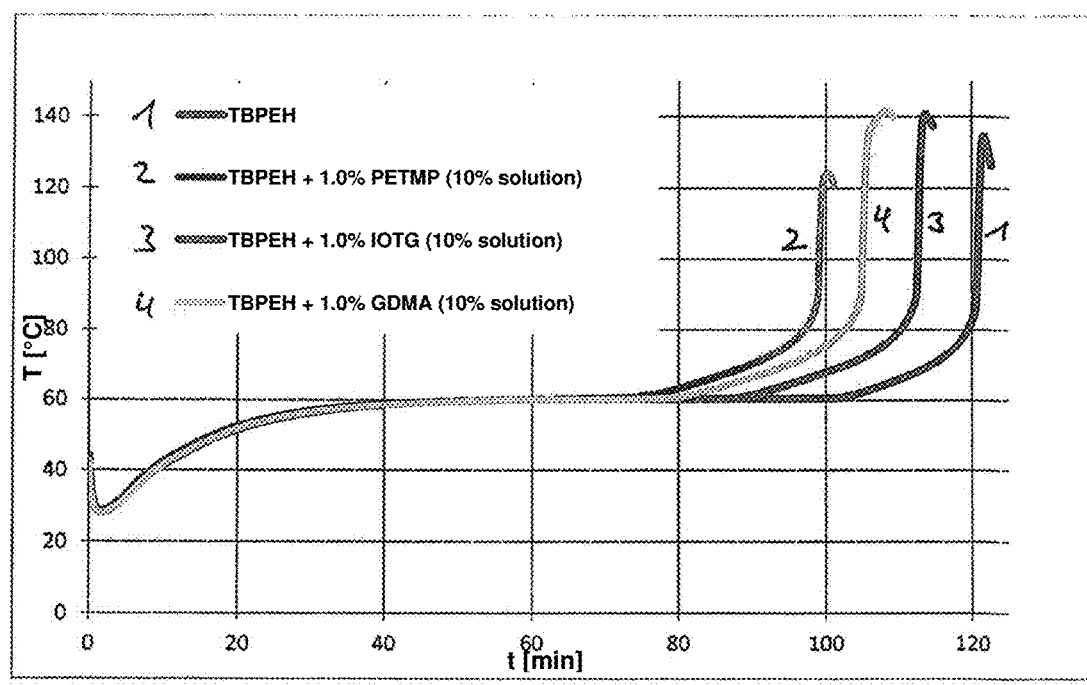
FIG. 12 shows the curing curve for the methyl methacrylate resin Degadur 1008 using 1% TBPEH alone or in combination with the mercaptans PETMP, IOTG or GDMA, at 1.0% in each case.

The results are shown in FIG. 12.

3.2 Curing at 60° C. Bath Temperature, Vinyl Ester Resin Derakane 411-350 (Ashland), DIN 19645, Acceleration of 1% BCHPC

| Peroxide (1%) | Mercapto accelerator solution | Gel time in min | Curing time in min | Exothermic peak in ° C. | Bath temperature in ° C. |
|---|---|---|---|---|---|
| BCHPC | None | 26 | 30 | 178 | 60 |
| BCHPC | 0.5% PETMP | 23 | 28 | 173 | 60 |
| BCHPC | 0.5% IOTG | 21 | 25 | 176 | 60 |
| BCHPC | 0.5% GDMA | 22 | 26 | 173 | 60 |

Figure 13:
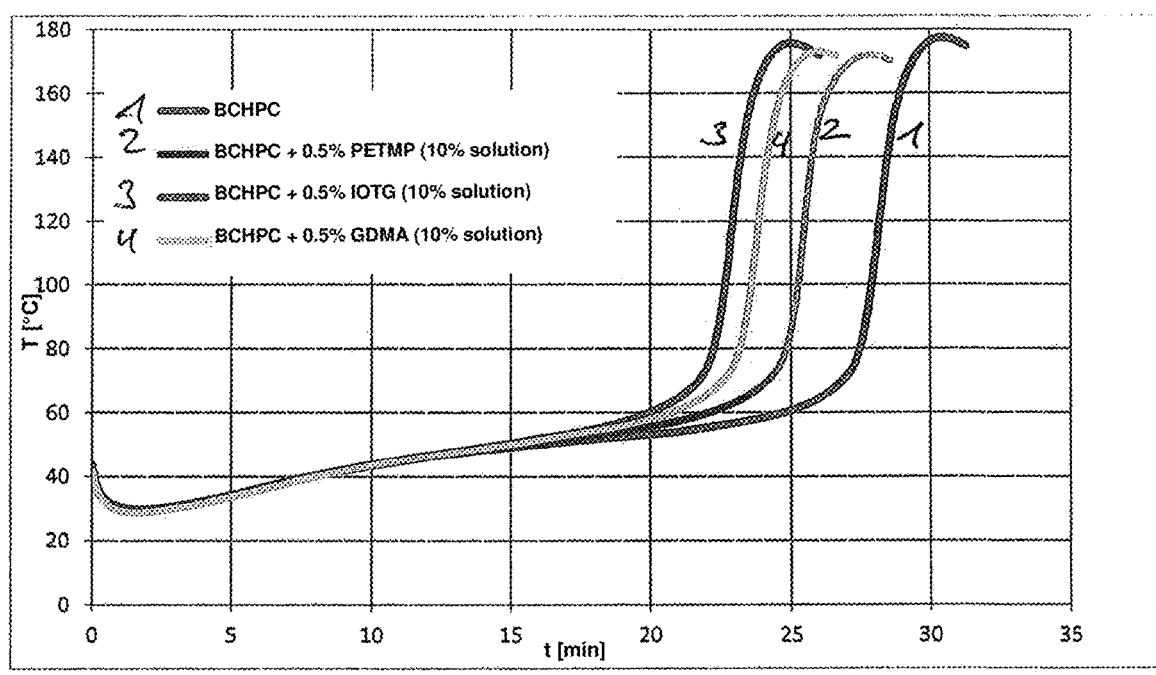
FIG. 13 shows the curing curve for the warm curing of the vinyl ester resin Derakane 411-350 using BCHPC alone or in combination with the mercaptans PETMP, IOTG or GDMA.

Accelerating effects can also be expected in other resin systems, as in this example with vinyl ester resin, although not to the same extent as for unsaturated polyester resins. The results are shown in FIG. 13.

The invention claimed is:

1. A method for curing an unsaturated polymer resin, comprising radically polymerizing the unsaturated polymer resin with one or more copolymerizable monomers and less than 1 ppm metals and metal salts, wherein an initiator system is used that comprises one or more organic peroxides and one or more mercaptans.

2. A method for curing an unsaturated polymer resin, comprising radically polymerizing the unsaturated polymer resin with one or more copolymerizable monomers and less than 1 ppm of metals and metal salts, wherein an initiator system is used that comprises one or more organic peroxides and one or more mercaptans, wherein the radical polymerization is carried out with 0 ppm in of tertiary amines.

3. The method according to claim 1, wherein the unsaturated polymer resin is selected from a group consisting of unsaturated polyester resins (UP resins), methyl methacrylate resins and vinyl ester resins.

4. The method according to claim 1, wherein the unsaturated polymer resin comprises an orthophthalic-acid-based UP resin.

5. The method according to claim 1, wherein the mercaptan is selected from a group consisting of glycol dimercaptoacetate (GDMA), pentaerythritol tetrakis (3-mercaptopropionate) (PETMP), isooctyl thioglycolate (IOTG) and combinations thereof.

6. The method according to claim 1, wherein the copolymerizable monomers are selected from a group consisting of styrene, α-methyl styrene and methyl methacrylate.

7. The method according to claim 1, wherein the organic peroxide is selected from a group consisting of cumyl hydroperoxide (CUHP), dicumyl peroxide (DCUP), tert-butylperoxy-2-ethylhexanoate (TBPEH), tert-butyl peroxy-3,5,5-trimethylhexanoate (TBPIN), optionally in solution with acetylacetone, tert-butyl peroxybenzoate (TBPB), optionally in solution with acetylacetone, dilauroyl peroxide (LP), bis-(4-tert-butylcyclohexyl)-peroxydicarbonate (BCHPC), dimyristyl peroxydicarbonate (MYPC), tert-butylperoxy-2-ethylhexylcarbonate (TBPEHC), 2,5-dimethyl-2,5-di-(tert-butylperoxy)-hexane (DHBP), methyl isobutyl ketone peroxide (MIKP), tert-amylperoxy-2-ethylhexanoate (TAPEH) and combinations thereof, such as BCHPC and MYPC.

8. The method according to claim 1, wherein the mercaptan comprises PETMP and the organic peroxide comprises BCHPC and/or MIKP.

9. The method according to claim 1, wherein the curing comprises radical polymerization at a temperature in the range of from approx. 40-150° C.

10. The method according to claim 1, wherein the curing comprises radical polymerization at a temperature of less than 40° C.

11. A composition comprising an unsaturated polymer resin, one or more mercaptans and one or more organic peroxides, wherein the amount of metals and metal salts in the composition is less than 1 ppm.

12. A kit comprising:
   (i) at least one unsaturated polymer resin and
   (ii) an initiator composition comprising one or more mercaptans and one or more organic peroxides,
   wherein the kit has less than 1 ppm metals and metal salts.

13. The method according to claim 1, wherein the curing comprises radical polymerization at a temperature of between 18-35° C.

14. The method according to claim 1, wherein the curing comprises radical polymerization at a temperature of between 20-30° C.

* * * * *